Patented Sept. 18, 1945

2,385,281

UNITED STATES PATENT OFFICE 2,385,281

POLYCYCLIC COMPOUNDS FROM ISO-PHORONE AND PROCESS FOR THE MANUFACTURE OF SAME

Oskar Huppert, Newark, N. J.

No Drawing. Application February 2, 1943,
Serial No. 474,492

4 Claims. (Cl. 260—307.6)

My invention relates to a process for obtaining a new benzo-cyclobutan derivative, more specifically my invention relates to a new condensation product and its use in various fields.

This invention has as an object the preparation of a new solvent for oils, waxes, gums, resins, cellulose derivatives.

A particular object of the invention is the manufacture of aqueous emulsions of organic acid esters of cellulose with aid of this solvent.

A further object is the utilization of this solvent in the synthesis of new resins of the alkyd type, protein modified resin solutions of the Vinylite type, plasticizers, textile assistants, heterocyclic compounds such as oxazolines with aid of this solvent with aminohydroxy compounds.

The art for preparing aqueous emulsions of cellulose acetate is up to date unknown. From solutions of cellulose acetate in organic solvents such as ketones, esters, ethers and oxides cellulose acetate is precipitated by addition of water and no emulsifying agent is known for preparing an aqueous stable emulsion. Only mixed esters of cellulose containing dicarboxylic acid radicals such as those of acetic, butyric, propionic are water soluble and only in presence of pyridine or as salts after partial hydrolysis in dilute sodium hydroxide.

I have now discovered a process which obviates all of the prior difficulties to obtain directly aqueous emulsions of cellulose acetate resp. of acetate-propionate or aceto-butyrate by mixing a solution of these cellulose esters in a specific solvent, which I have found, with water containing an emulsifying agent.

This specific solvent is a derivative of benzo-cyclobutan (ring index No. 567, Patterson). I prepare this solvent by heating 3.5.5.trimethyl-cyclohexan-2-one-1 (isophorone) with maleic anhydride.

This solvent, prepared by a condensation process, dissolves cellulose acetate, the solution gives by agitating with water containing sulfonated castor oil an aqueous stable emulsion of cellulose acetate.

While other emulsifying agents such as sodium alkylsulfates, such as sodium dodecylsulfate, amine-alkylsulfates such as diethylcyclohexylamine, organic quaternary ammonium salts, such as cetylammoniumbromide, sodium oleate, dextrine, gum tragacanth in general may be employed, the preferred emulsifying assistant is sulfonated oil, such as sulfonated castor oil.

The solvent, resp. the aqueous emulsion of cellulose acetate, prepared with aid of this solvent, may be used in the preparation of finished textiles resistant to laundering, for waterproofing textiles, fibers, fibrous material, paper, in adhesive compositions, sizings, further for vehicles in carrying dyes or pigments.

Assuming that the new solvent is formed by condensation, the chemical equation would be as follows.

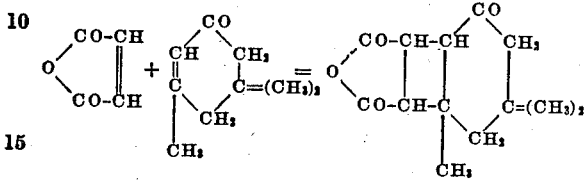

Maleic anhydride+isophorone=7.5.5.trimethyl-cyclohexan-one 3-benzocyclobutan dicarboxy-anhydride-1.2.

An oxazoline with strong specific green fluorescence is formed by heating with 2 amino-2 methyl-1 propanol, as follows.

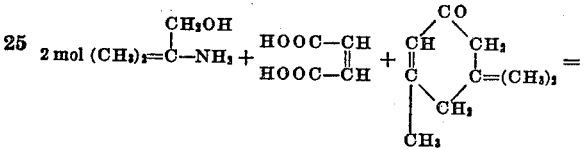

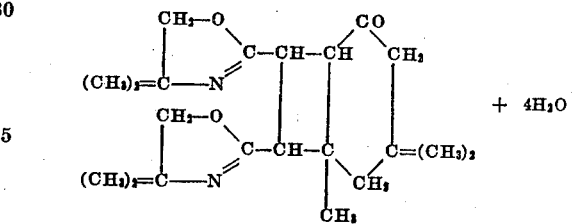

In order that the invention may be clearly understood and readily carried into effect, certain examples of modes carrying the new processes into effect will now be described in greater detail.

*Example 1*

1 mol (138 g.) isophorone and 1 mol (98 g.) maleic anhydride are heated one hour at a temperature of 110° C.

*Example 2*

100 g. isophorone and 3 g. maleic anhydride are heated on a boiling water bath one hour. Then 6 g. cellulose acetate are added and the mixture is again heated at a temperature of 90 to 100° C. for 10 minutes.

Example 3

The solution of cellulose acetate, as prepared in Example 2 is mixed as a lacquer phase with water containing 1.5% sulfonated castor oil. The so obtained aqueous emulsion of cellulose acetate is stable by boiling.

Example 4

100 g. isophorone and 12 g. maleic anhydride are heated at a temperature at 110° C. Then 24 g. cellulose acetate are added and the mixture is then heated on a boiling water bath for one hour. The solution is then diluted with 100 g. carbitol (diethylenglycol-ethylether) and mixed with 16 g. sulfonated castor oil. The composision diluted with water in a ratio 1:10 is applied as a waterproofing emulsion for garments when they have just been dry cleaned.

Example 5

The solvent as obtained in Example 1 is precautiously mixed with 2 mol (178 g.) of 2 amino-2 methyl-1 propanol, whereby the temperature rises vehemently to 85° C. Afterwards the mixture is heated one hour at a temperature of 125° C. One obtains an oxazoline derivative from 7.5.5.trimethylcyclohexan-one 3 benzocylobutandicarboxylic acid-1,2.

Other aminohydroxy compounds such as 2 amino-1 butanol, 2 amino-2 ethyl-1,3 propandiol, or tris(hydroxymethyl)-aminomethane are also recommended.

It will be understood that the above examples are illustrative only and are not to be construed as limiting the scope of my invention.

My invention now having been described, what I claim is:

1. The process for producing a condensation product, which comprises condensing isophorone, maleic anhydride and a primary 1.2 hydroxyalkyl amine.

2. The process for producing a condensation product, which comprises condensing isophorone, maleic-anhydride and 2-amino-2 methyl-1 propanol by heating.

3. A condensation product prepared by reacting isophorone, maleic anhydride and a primary 1.2 hydroxyalkyl amine.

4. A condensation product prepared by reacting isophorone, maleic anhydride and 2 amino-2 methyl-1 propanol.

OSKAR HUPPERT.